Nov. 30, 1943.   R. CONRAD   2,335,488
PROCESS FOR CARRYING OUT CATALYTIC REACTIONS IN THE GAS PHASE
Filed June 24, 1938
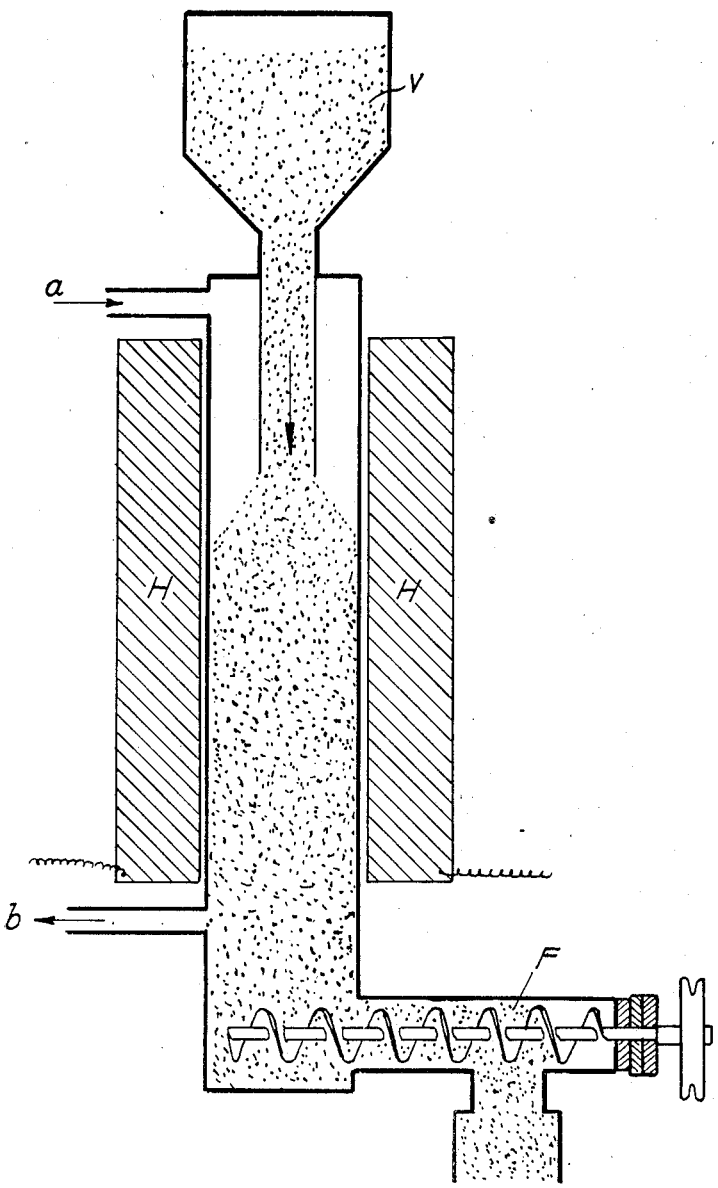
Richard Conrad
INVENTOR.
BY Hutz and Joslin
HIS ATTORNEYS

UNITED STATES PATENT OFFICE 2,335,488

PROCESS FOR CARRYING OUT CATALYTIC REACTIONS IN THE GAS PHASE

Richard Conrad, Heidelberg, Germany; vested in the Alien Property Custodian

Application June 24, 1938, Serial No. 215,589
In Germany July 3, 1937

3 Claims. (Cl. 260—683.3)

The present invention relates to a process for carrying out catalytic reactions in the gas phase.

In carrying out catalytic reactions in the gas phase, as for example hydrogenations, dehydrogenations, oxidations, hydrations and the like, the catalysts used usually subside in their activity after use for more or less long periods so that they must be regenerated or replaced by fresh catalysts. In order to render a continuous regeneration possible, it has already been proposed to lead the catalyst through the reaction chamber, for example on a movable support or by allowing it to move downwards by reason of its own weight. Even when working in this way it is usually unavoidable that the catalyst loses considerably in activity in the reaction chamber and this leads to a diminution in yield.

I have now found that in catalytic gas reactions a satisfactory rate of conversion of the gases can be maintained throughout the reaction zone by moving the catalyst through said reaction zone and raising the temperature therein in the direction of the movement of the catalyst in such manner that the rate of conversion in the reaction zone does not decrease substantially along said zone.

In practice, the temperature of the reaction chamber is increased continuously or in stages from the point at which the catalyst enters to the point at which it leaves, care being taken that the movement of the catalyst, which may also be effected continuously or in stages, and the increase in temperature are so selected that the action of the catalyst remains substantially the same. The conditions may readily be determined in a simple manner by preliminary experiment.

The process is applicable for example for the dehydrogenation of hydrocarbons, advantageously those of low molecular weight, as for example for rendering benzines nonknocking under atmospheric or increased pressure, it may also be used in the production of liquid products by the reduction of oxides of carbon; the production of unsaturated hydrocarbons by the incomplete combustion of hydrocarbons with oxygen may also be carried out with advantage by the said process, heat being withdrawn in a suitable manner if necessary.

Other fields of use are for example the hydration of acetylene to form acetaldehyde in the gas phase, and the reaction of acetylene with steam to form acetone.

The process offers special advantages when the catalysts are very short-lived, as for example in the catalytic dehydrogenation of hydrocarbons of low molecular weight at atmospheric pressure. At the high temperatures between 500° and 600° C. required for said reaction, all hitherto known catalysts undergo a comparatively rapid decrease in their activity which renders necessary a frequent regeneration of the catalyst and consequent interruption of the continuous operation. These difficulties are overcome in a simple manner by the present process.

The process will be further described with reference to the accompanying drawing, but the invention is not restricted to the particular arrangement of apparatus shown.

The catalyst passes from a reservoir V into the vertical reaction chamber in which a definite temperature distribution is maintained by electrical or gas heating H. A transporting device, as for example a conveyor worm F, is provided at the lower end of the reaction chamber and this continuously withdraws a part of the catalyst and moves it to a chamber from which it can be removed through a sluice. The reaction gases enter at the top at $a$ into a preheating zone, then meet the fresh, slowly descending catalyst and move in the same direction as the latter. The reaction gases leave the reaction chamber somewhat above the conveyor worm F at $b$ and are cooled and then further worked up. The reaction gases may also be led in counter-current. The catalyst need not be withdrawn continuously. An appropriate amount may be withdrawn for example at equal intervals of ½, 1 or 2 hours or more. It is important that the temperature in the reaction chamber should gradually rise proportionately to the decrease in the activity of the catalyst along its path through the reaction chamber and the increase in temperature and the speed of transportation of the catalyst must therefore be adapted to each other.

The following examples will further illustrate the nature of this invention but the invention is not restricted to these examples.

Example 1

A vertical reaction tube of quartz, constructed similar to that shown in the drawing, is filled with 120 cubic centimeters of an active carbon which has been prepared by heating lean coal with steam; 2.5 cubic centimeters per hour of the active carbon are withdrawn by a conveyor worm. The same amount of active carbon descends continuously from the reservoir so that the reaction chamber always remains full of the active carbon. Downwards through the reaction chamber technical butane is led at a speed of 24 liters per hour. The reaction chamber is heated externally by three separate electrical heating coils. At the point at which the gas meets the carbon, the latter has a temperature of 530° C. In the reaction chamber, the temperature of the carbon filling rises and reaches 580° C. at the end thereof. 28 per cent of the butane passed through are reacted. 80 per cent of the reacted butane are converted into butylene and propylene. If, however, the whole of the reaction tube be kept at the mean temperature of about 550° C., only 14 per cent of the butane are converted of which 70 per cent consist of butylene and propylene.

*Example 2*

In the same apparatus as in Example 1, 48 liters per hour of propane are led over an active carbon which has been impregnated with such an amount of aluminum nitrate solution and heated that it contains 3 per cent of $Al_2O_3$. The temperature at the inlet is 570° and at the outlet 625° C. 2.6 cubic centimeters of catalyst are withdrawn per hour; the same amount is added at the top. 33 per cent of the propane are converted and 60 per cent of the converted propane are obtained as propylene. This result may be maintained for weeks without trouble.

*Example 3*

In the apparatus described in Examples 1 and 2, 24 liters per hour of isobutane are led over 120 cubic centimeters of a catalyst consisting of active carbon which has been impregnated with such an amount of ferric nitrate and heated that it contains 3.5 per cent of iron as the oxide. The inlet temperature is 495° and the final temperature 566° C. 1.7 cubic centimeters of carbon are removed per hour and added again at the top in a fresh form. The final gas contains 14.0 per cent of isobutylene, 1.6 per cent of propylene and 0.4 per cent of ethylene. 22 per cent of the isobutane are converted by a single passage. The yield of isobutylene amounts to 75 per cent calculated with reference to the isobutane converted.

What I claim is:

1. A process for carrying out catalytic dehydrogenations of saturated hydrocarbons in the gas phase by passing the same through a reaction zone at a temperature of between about 500 and about 600° C. which comprises moving the catalyst in the form of a bed through the reaction zone and raising the temperature therein in the direction of the movement of the catalyst in such manner that the rate of conversion in the subsequent parts of the reaction zone does not decrease in a substantial degree.

2. A process for the production of unsaturated hydrocarbons by the incomplete combustion of hydrocarbons with oxygen in the gas phase by passing the same through a reaction zone at a temperature of between about 500 and about 600° C. which comprises moving the catalyst in the form of a bed through the reaction zone and raising the temperature therein in the direction of the movement of the catalyst in such manner that the rate of conversion in the subsequent parts of the reaction zone does not decrease in a substantial degree.

3. A process of carrying out catalytic dehydrogenations of saturated hydrocarbons in the gas phase at temperatures of between about 500 and about 600° C., which comprises moving the catalyst in the form of a bed concurrently with the material to be dehydrogenated through the reaction zone and raising the temperature therein in the direction of the movement of the catalyst in such manner that the rate of conversion in the subsequent parts of the reaction zone does not decrease in a substantial degree.

RICHARD CONRAD.